(12) United States Patent
Huang

(10) Patent No.: US 12,222,613 B2
(45) Date of Patent: *Feb. 11, 2025

(54) MANUFACTURING METHOD OF DISPLAY PANEL AND DISPLAY PANEL

(71) Applicant: TCL CHINA STAR OPTOELECTRONICS TECHNOLOGY CO., LTD., Shenzhen (CN)

(72) Inventor: Xiuhong Huang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/925,705

(22) PCT Filed: Apr. 1, 2022

(86) PCT No.: PCT/CN2022/084714
§ 371 (c)(1),
(2) Date: Sep. 28, 2023

(87) PCT Pub. No.: WO2023/178725
PCT Pub. Date: Sep. 28, 2023

(65) Prior Publication Data
US 2024/0219782 A1    Jul. 4, 2024

(30) Foreign Application Priority Data

Mar. 21, 2022  (CN) .......................... 202210275121.1

(51) Int. Cl.
G02F 1/1345    (2006.01)
G02F 1/1335    (2006.01)
G02F 1/1339    (2006.01)

(52) U.S. Cl.
CPC .... *G02F 1/13458* (2013.01); *G02F 1/133514* (2013.01); *G02F 1/1339* (2013.01); *G02F 2201/50* (2013.01)

(58) Field of Classification Search
None
See application file for complete search history.

(56) References Cited

U.S. PATENT DOCUMENTS

2012/0032898 A1* 2/2012 Li .......................... G06F 3/0446
345/173
2016/0128174 A1    5/2016 Lim
(Continued)

FOREIGN PATENT DOCUMENTS

CN    108153070 A    6/2018
CN    109212851 A    1/2019
(Continued)

OTHER PUBLICATIONS

Chinese Office Action issued in corresponding Chinese Patent Application No. 202210275121.1 dated Jun. 26, 2023, pp. 1-7, 16pp.
(Continued)

*Primary Examiner* — Shan Liu
(74) *Attorney, Agent, or Firm* — PV IP PC; Wei Te Chung

(57) ABSTRACT

The present application provides a manufacturing method of a display panel and the display panel. The manufacturing method of the display panel includes following steps: providing a display panel main body, the display panel main body including at least one metal pad located in an outer pin joint area, and a side of the at least one metal pad being exposed to an outside; forming a protective member covering the at least one metal pad on a side of the display panel main body; patterning the protective member to expose the at least one metal pad; forming a conductive layer on an
(Continued)

exposed surface of the at least one metal pad; and forming a chip on film on a surface of the conductive layer away from the at least one metal pad.

16 Claims, 9 Drawing Sheets

(56) References Cited

U.S. PATENT DOCUMENTS

| | | | | |
|---|---|---|---|---|
| 2017/0162607 A1* | 6/2017 | Abe | ............... | H10K 50/00 |
| 2017/0357121 A1* | 12/2017 | Cho | ............... | G02F 1/1368 |
| 2017/0358602 A1* | 12/2017 | Bae | ............... | H01L 23/482 |
| 2020/0117029 A1* | 4/2020 | Sung | ............... | B32B 27/30 |
| 2020/0287169 A1* | 9/2020 | Sung | ............... | H10K 71/00 |
| 2021/0066435 A1* | 3/2021 | Ryu | ............... | H10K 59/131 |

FOREIGN PATENT DOCUMENTS

| | | | | |
|---|---|---|---|---|
| CN | 109659304 A | | 4/2019 | |
| CN | 110060954 A | | 7/2019 | |
| CN | 110888276 A | | 3/2020 | |
| CN | 111679523 A | | 9/2020 | |
| CN | 112885236 A | | 6/2021 | |
| CN | 113156722 A | | 7/2021 | |
| CN | 113721398 A | | 11/2021 | |
| CN | 113990209 A | | 1/2022 | |
| CN | 109326610 B | * | 3/2022 | ............. G09F 9/301 |
| CN | 114121868 A | * | 3/2022 | ........... H01L 33/005 |

OTHER PUBLICATIONS

PCT International Search Report for International Application No. PCT/CN2022/084714, mailed on Dec. 15, 2022, 10pp.

PCT Written Opinion of the International Search Authority for International Application No. PCT/CN2022/084714, mailed on Dec. 15, 2022, 9pp.

* cited by examiner

MANUFACTURING METHOD OF DISPLAY PANEL AND DISPLAY PANEL

CROSS REFERENCE TO RELATED APPLICATIONS

This application is a National Phase of PCT Patent Application No. PCT/CN2022/084714 having International filing date of Apr. 1, 2022, which claims the benefit of priority of Chinese Application No. 202210275121.1 filed on Mar. 21, 2022. The contents of the above applications are all incorporated by reference as if fully set forth herein in their entirety.

BACKGROUND OF INVENTION

Field of Invention

The present application relates to a field of display technology, and particularly to a manufacturing method of a display panel and the display panel.

Description of Prior Art

In the field of display technology, outer pin joint areas of display panels are usually removed, and then side bonding processes are used to achieve bonding connections between metal pads and chip on films in order to obtain an ultimate narrow frame effect.

In existing side bonding process routes, conductive films are usually used to achieve electrical connections between the metal pads and the chip on films. However, before printing a conductive material such as silver paste on sides of the display panels, since the metal pads are exposed, the exposed metal pads are prone to corrosion, resulting in a poor conduction phenomenon between the conductive films and the metal pads, which reduces a manufacturing yield of side bonding products.

SUMMARY OF INVENTION

The present application provides a manufacturing method of a display panel and the display panel to solve a technical problem of poor conduction between conductive films and metal pads caused by corrosion of the metal pads in side bonding processes, and to improve a manufacturing yield of side bonding products.

The present application provides a manufacturing method of a display panel, which including following steps:
  providing a display panel main body, the display panel main body concluding at least one metal pad located in an outer pin joint area, and a side of the at least one metal pad being exposed to an outside;
  forming a protective member covering the at least one metal pad on a side of the display panel main body;
  patterning the protective member to expose the at least one metal pad;
  forming a conductive layer on an exposed surface of the at least one metal pad; and
  forming a chip on film on a surface of the conductive layer away from the at least one metal pad.

Alternatively, in some embodiments of the present application, wherein the protective member includes an adhesive layer and a protective film, and the adhesive layer is attached between the display panel main body and the protective film.

Alternatively, in some embodiments of the present application, wherein a material of the protective film includes one or more of a polyethylene terephthalate, a polystyrene, a polycarbonate, a polyvinyl chloride, and a phthalaldehyde.

Alternatively, in some embodiments of the present application, wherein the step of forming the protective member covering the at least one metal pad on the side of the display panel main body includes forming an adhesive protective member by using a coating process, and a material of the protective member is a peelable coating.

Alternatively, in some embodiments of the present application, wherein the peelable coating includes one or more of an acrylic resin, a polyurethane, and an epoxy resin.

Alternatively, in some embodiments of the present application, wherein an opening exposing the at least one metal pad is formed on the protective member after the step of patterning the protective member; and the step of forming the conductive layer on the exposed surface of the at least one metal pad includes:
  filling the opening with a conductive material;
  curing the conductive material to form the conductive layer, and a thickness of the conductive layer being less than or equal to a thickness of the protective member.

Alternatively, in some embodiments of the present application, wherein the display panel main body includes an array substrate and a color film substrate disposed opposite to each other, and a frame glue disposed between the array substrate and the color film substrate; the frame glue is located between the at least one metal pad and the color film substrate, and the frame glue, a part of the array substrate, and a part of the color film substrate are exposed from the opening.

Alternatively, in some embodiments of the present application, wherein in a direction from the array substrate to the color film substrate, an opening length of the opening ranges from one quarter to one half of a length of the protective member.

Alternatively, in some embodiments of the present application, wherein the conductive material is a silver paste.

Alternatively, in some embodiments of the present application, wherein the at least one metal pad is a copper pad.

Alternatively, in some embodiments of the present application, wherein after the step of patterning the protective member and before the step of forming the conductive layer on the exposed surface of the at least one metal pad, the manufacturing method further includes cleaning an exposed part of the at least one metal pad.

Alternatively, in some embodiments of the present application, wherein after the step of forming the conductive layer on the exposed surface of the at least one metal pad and before the step of forming the chip on film on the surface of the conductive layer away from the at least one metal pad, the manufacturing method further includes removing the protective member after being patterned.

Alternatively, in some embodiments of the present application, wherein the step of patterning the protective member includes patterning the protective member by using a laser cutting process to form an opening exposing the at least one metal pad on the protective member.

Alternatively, in some embodiments of the present application, wherein an opening area of the opening is greater than an area of the exposed surface of the at least one metal pad.

Alternatively, in some embodiments of the present application, wherein the display panel main body includes an array substrate and a color film substrate disposed opposite to each other, and a frame glue disposed between the array substrate and the color film substrate, and the frame glue is located between the at least one metal pad and the color film substrate;

in a direction parallel to a plane the array substrate is located, an opening width of the opening is equal to a width of the at least one metal pad; and in a direction from the array substrate to the color film substrate, an opening length of the opening is greater than a length of the at least one metal pad.

Alternatively, in some embodiments of the present application, wherein the step of forming the chip on film on the surface of the conductive layer away from the at least one metal pad includes:

forming an anisotropic conductive adhesive layer on a side of the conductive layer away from the at least one metal pad;

attaching and bonding the chip on film to a surface of the anisotropic conductive adhesive layer.

A display panel, wherein a manufacturing method of the display panel includes following steps:

providing a display panel main body, the display panel main body concluding at least one metal pad located in an outer pin joint area, and a side of the at least one metal pad being exposed to an outside;

forming a protective member covering the at least one metal pad on a side of the display panel main body;

patterning the protective member to expose the at least one metal pad;

forming a conductive layer on an exposed surface of the at least one metal pad; and forming a chip on film on a surface of the conductive layer away from the at least one metal pad.

In the manufacturing method of the display panel of the present application, before forming the conductive layer, the protective member covering the at least one metal pad is first formed on the side of the display panel main body, wherein the forming of the protective member can protect the at least one metal pad from an intrusion of external water and oxygen, so as to avoid corrosion of the at least one metal pad. Therefore, since the at least one metal pad is not corroded until patterning the protective member to expose the at least one metal pad and then forming the conductive layer on the exposed surface of the at least one metal pad, good conductivity between the at least one metal pad and the conductive layer can be ensured to achieve a stable connection between the at least one metal pad and the chip on film, which can improve the manufacturing yield of side bonding products.

BRIEF DESCRIPTION OF DRAWINGS

In order to clearly explain technical solutions in embodiments of the present application, the following will briefly introduce drawings needed to be used in descriptions of the embodiments. It is obvious that the drawings in the following descriptions are only some embodiments of the present application. For those skilled in the art, other drawings can be obtained according to these drawings without paying creative labor.

DETAILED DESCRIPTION OF EMBODIMENTS

Figure 1:
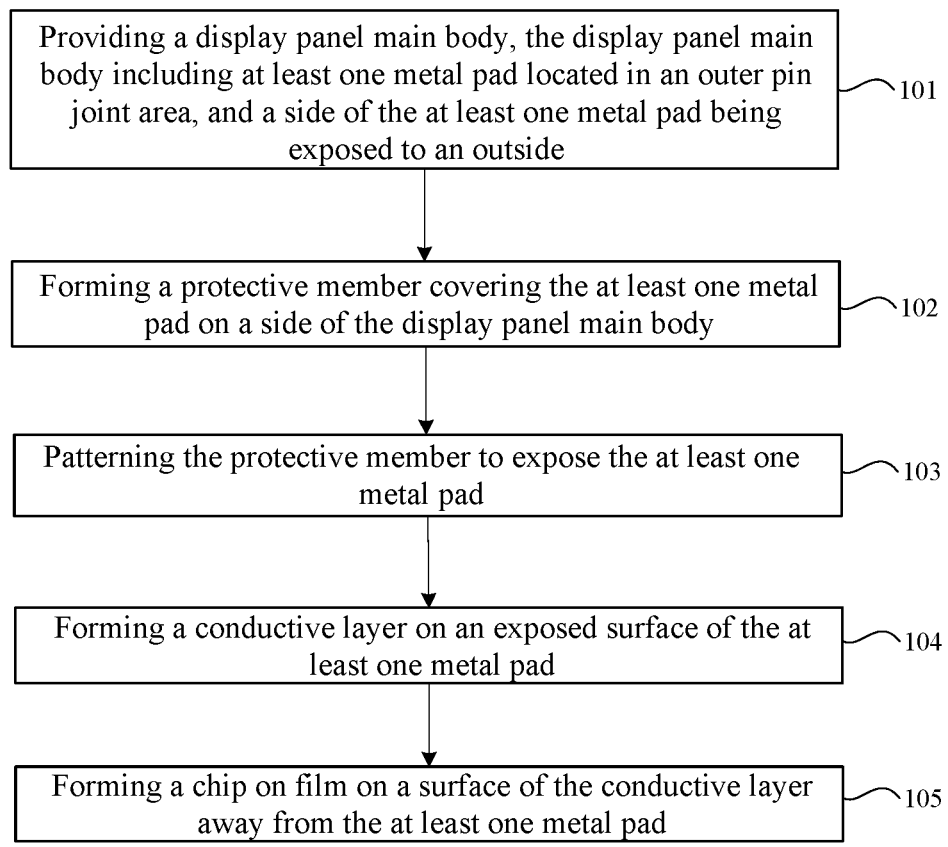
FIG. 1 is a schematic flow diagram of a manufacturing method of a display panel provided by the present application.
Figure 2:
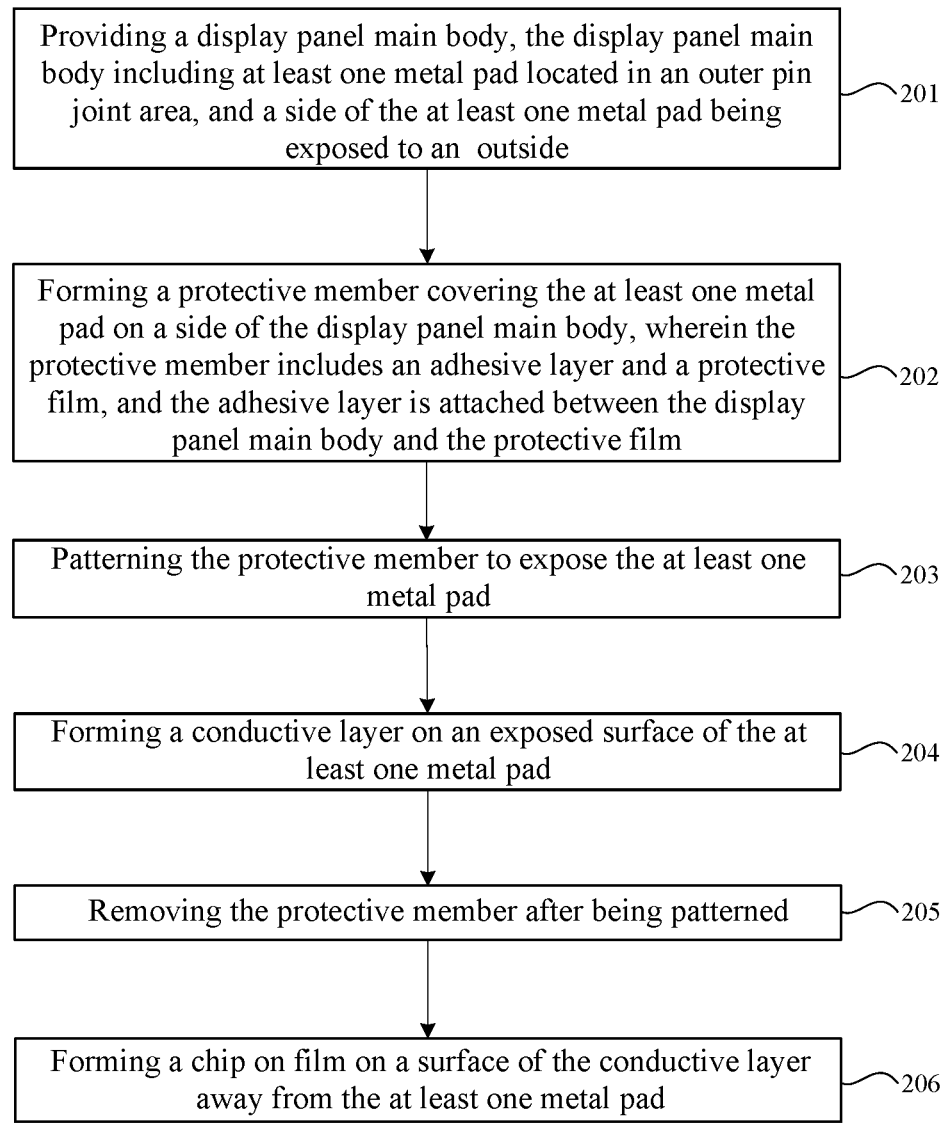
FIG. 2 is a schematic flow diagram of a manufacturing method of a display panel provided in a first embodiment of the present application.

Technical solutions in embodiments of the present application will be described clearly and completely below in combination with attached drawings in the embodiment of the present application. Obviously, the described embodiments are only part of the embodiments of the present application, not all of the embodiments. Based on the embodiments in the present application, all other embodiments obtained by those skilled in the art without creative work belong to a scope of a protection of the present application. In addition, it should be understood that the specific embodiments described herein are only used to illustrate and explain the present application and are not used to limit the present application. In the present application, in the absence of a contrary explanation, location words used, such as "up" and "down", usually refer to up and down under actual uses or working states of devices, specifically drawing directions in the attached drawings; and words "inside" and "outside" are referred to contours of the devices.

In the prior art, a side bonding process route of a display panel includes: a first step of grinding a side of a display panel main body by using a side grinding process to expose metal pads after completing a manufacturing process of the display panel main body; a second step of cleaning exposed surfaces of metal pads by using a laser cutting process to remove foreign matters remaining on exposed surfaces of the metal pads after the side of the display panel is grinded, wherein the foreign matters can include adhesive organic compounds; a third step of printing a conductive material such as a silver paste on the exposed surfaces of the metal pads to form a conductive film; a fourth step of patterning the conductive film by using the laser cutting process to carve the conductive film into conductive parts corresponding to the metal pads one to one; and a fifth step of bonding chip on films on the side of the display panel main body and completing electrical connections between the chip on films and the metal pads.

However, in the above process route, before printing the conductive material on the exposed surfaces of the metal pads, the metal pads such as copper pads are prone to corrosion due to an invasion of external water and oxygen in a long period of exposure; since the corroded metal pads cannot be cleaned by the laser cutting process, it will lead to a poor conduction phenomenon between the conductive film and the metal pads, which greatly reduces a manufacturing yield of side bonding products.

Further, an array substrate and a color film substrate in the display panel are usually sealed by a frame glue, and the frame glue is located on a side of the metal pads close to the color film substrate. In the above process route, since the second step and the fourth step both need to use the laser cutting process, a use of twice laser cutting process will aggravate a damage to the frame glue, which not only reduces hermeticity between the array substrate and the color film substrate, but also increases dislocation probabilities between the array substrate and the color film substrate, thus further reducing the manufacturing yield of side bonding products.

Based on technical problems existing in the side bonding process route of the existing display panel, the present application provides a manufacturing method of a display panel and the display panel. The following will describe in detail.

Referring to FIG. 1, the present application provides the manufacturing method of the display panel, which includes following steps:

101: providing a display panel main body, the display panel main body including at least one metal pad located in an outer pin joint area, and a side of the at least one metal pad being exposed to an outside;

102: forming a protective member covering the at least one metal pad on a side of the display panel main body;

103: patterning the protective member to expose the at least one metal pad;

104: forming a conductive layer on an exposed surface of the at least one metal pad; and 105: forming a chip on film on a surface of the conductive layer away from the at least one metal pad.

Therefore, in the manufacturing method of the display panel of the present application, before forming the conductive layer, the protective member covering the at least one metal pad is first formed on the side of the display panel main body, wherein the forming of the protective member can protect the at least one metal pad from an intrusion of external water and oxygen, so as to avoid corrosion of the at least one metal pad. Therefore, since the at least one metal pad is not corroded until patterning the protective member to expose the at least one metal pad and then forming the conductive layer on the exposed surface of the at least one metal pad, good conductivity between the at least one metal pad and the conductive layer can be ensured to achieve a stable connection between the at least one metal pad and the chip on film, which can improve the manufacturing yield of side bonding products.

The manufacturing method of the display panel provided by the present application will be described in detail through specific embodiments. It should be noted that an order of descriptions of the following embodiments is not a limitation of a preferred order of the embodiments.

It should be noted that the display panel in the present application can be a liquid crystal display panel or an organic light-emitting diode display panel. The following embodiments of the present application only take a structure when the display panel is the liquid crystal display panel as an example, but are not limited to this.

Figure 3A:
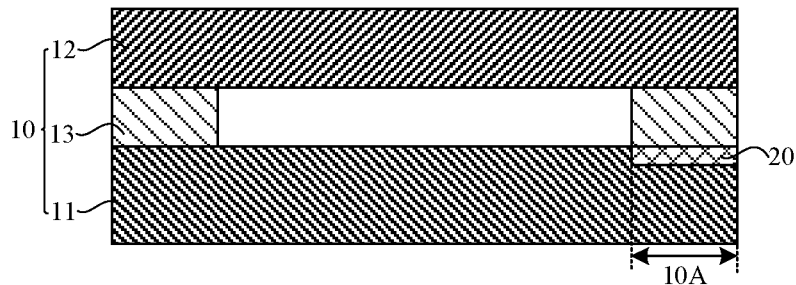
FIG. 3A to FIG. 3F are cross-sectional schematic structural diagrams obtained in sequence in each step of the manufacturing method of the display panel shown in FIG. 2.
Figure 4A:
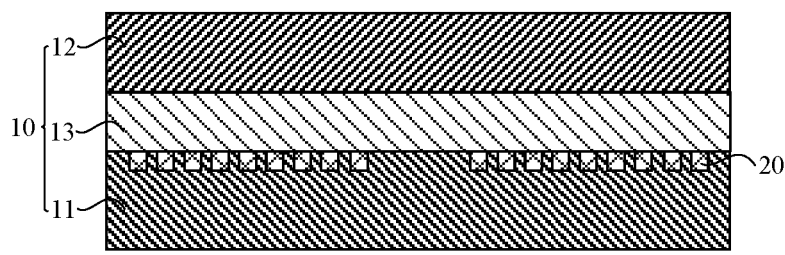
FIG. 4A to FIG. 4E are lateral schematic structural diagrams corresponding to FIG. 3A to FIG. 3E, respectively.

Referring to FIG. 2, FIG. 3A to FIG. 3F, and FIG. 4A to FIG. 4E, a manufacturing method of a display panel 100 provided in a first embodiment of the present application includes following steps:

201: providing a display panel main body 10, the display panel main body 10 including at least one metal pad 20 located in an outer pin joint area 10A, and a side of the at least one metal pad 20 being exposed to an outside, as shown in FIG. 3A and FIG. 4A.

Specifically, the display panel main body 10 includes an array substrate 11 and a color film substrate 12 disposed opposite to each other, and a frame glue 13 disposed between the array substrate 11 and the color film substrate 12. The frame glue 13 is located between the at least one metal pad 20 and the color film substrate 12. Wherein the side of the at least one metal pad 20 can be exposed by using a side grinding process.

In the present embodiment, the at least one metal pad 20 is a copper pad.

It should be noted that the display panel main body 10 in the present application further includes a liquid crystal layer (not shown in drawings) disposed between the array substrate 11 and the color film substrate 12, related technologies are the prior art and will not be repeated here.

Figure 3B:
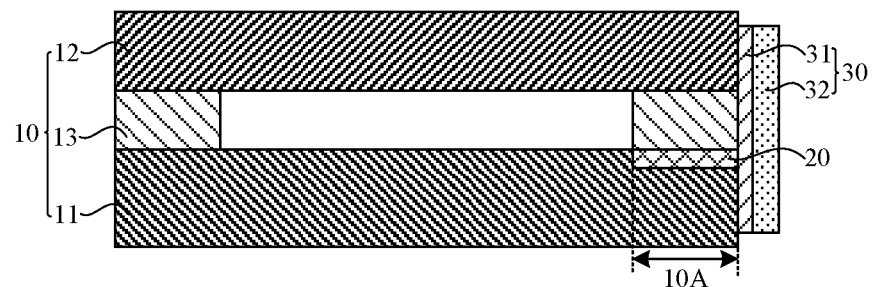
Figure 4B:
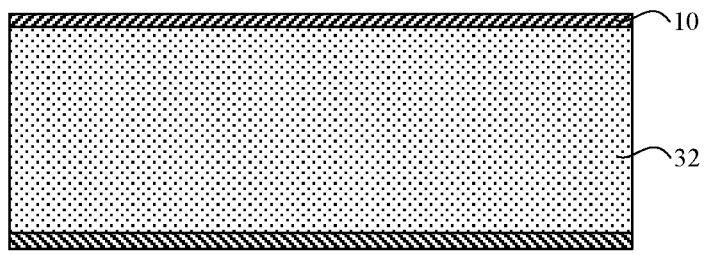

202: forming a protective member 30 covering the at least one metal pad 20 on the side of the display panel main body 10, wherein the protective member 30 includes an adhesive layer 31 and a protective film 32, and the adhesive layer 31 is attached between the display panel main body 10 and the protective film 32, as shown in FIG. 3B and FIG. 4B.

Wherein the forming of the protective member 30 can protect the at least one metal pad 20 from intrusion of external water and oxygen, so as to avoid corrosion of the at least one metal pad 20.

In the process route of the existing display panel, since the metal pads are exposed after the side grinding process, a corrosion problem of the metal pads easily occurs after being placed for a long time, and the exposed surfaces of the metal pads are not covered with the conductive film until the conductive material is printed, therefore, an interval between the side grinding process and a printing process of the conductive material needs to be strictly controlled in the existing process route. However, in the present embodiment, since the side of the at least one metal pad 20 is covered with the protective member 30 after the side grinding process, the at least one metal pad 20 is under protection of the protective member 30, it is not necessary to control the interval between the side grinding process and the printing process of the conductive material, so that a storage time of the display panel main body 10 can be prolonged, and requirements for storage conditions of the display panel main body 10 can be reduced.

In the present embodiment, the protective member 30 also covers the frame glue 13, a part of the array substrate 11, and a part of the color film substrate 12. It should be noted that the protective member 30 can further cover an entire side of the array substrate 11 and an entire side of the color film substrate 12, and the present application does not specifically limit a coverage area of the protective member 30.

Specifically, before forming the protective member 30, a release film (not shown in the drawings) is attached to a side of the adhesive layer 31 away from the protective film 32. The protective member 30 is attached to the side of the display panel main body 10 after tearing the release film, and a bonding between the protective film 32 and the display panel main body 10 is achieved through the adhesive layer 31.

Since the protective film 32 in the present embodiment is prepared in advance, the protective film 32 has high film thickness uniformity. Therefore, when the protective film 32 is bonded to the side of the display panel main body 10, connection stability between the protective film 32 and the display panel main body 10 can be improved.

In the present embodiment, a material of the protective film 32 can include one or more of a polyethylene terephthalate, a polystyrene, a polycarbonate, a polyvinyl chloride, and a phthalaldehyde. The protective film 32 made of one or more of above materials has good dimensional stability, so that the protective film 32 can form different patterns under a laser irradiation to meet usage requirements in different application scenarios.

It should be noted that a material of the adhesive layer 31 can be a pressure-sensitive adhesive or other adhesive materials with a bonding effect, and the present application does not specifically limit the material of the adhesive layer 31.

Figure 3C:
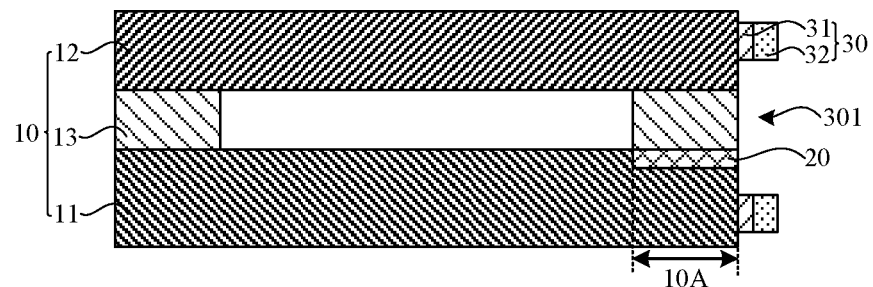
Figure 4C:
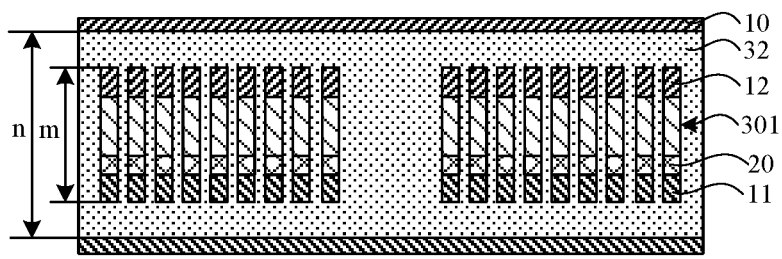

203: patterning the protective member 30 to expose the at least one metal pad 20, as shown in FIG. 3C and FIG. 4C.

Specifically, patterning the protective member 30 by using a laser cutting process to form an opening 301 exposing the at least one metal pad 20 on the protective member 30. Wherein the opening 301 penetrates the adhesive layer 31 and the protective film 32. In the present embodiment, the frame glue 13, the part of the array substrate 11, and the part of the color film substrate 12 are also exposed from the opening 301 apart from the at least one metal pad 20.

Further, an opening area of the opening 301 is greater than or equal to an area of the exposed surface of the at least one metal pad 20. In the present embodiment, in a direction parallel to a plane the array substrate 11 is located, an opening width of the opening 301 is equal to a width of the at least one metal pad 20; and in a direction from the array substrate 11 to the color film substrate 12, an opening length m of the opening 301 is greater than a length of the at least one metal pad 20. Wherein in the direction from the array substrate 11 to the color film substrate 12, the opening length m of the opening 301 ranges from one quarter to one half of a length n of the protective member 30. In some specific embodiments, the opening length m of the opening 301 is one quarter, one third, or one half of the length n of the protective member 30. Specifically, the length n of the protective member 30 is equal to a length of the protective film 32.

In the present embodiment, the opening length m of the opening 301 is one half of the length n of the protective member 30. When the opening width of the opening 301 is equal to the width of the at least one metal pad 20, since the opening length m of the opening 301 is equal to a length of a conductive layer 40 formed in a subsequent step, the present embodiment can improve a contact area between the at least one metal pad 20 and the conductive layer 40 by setting the opening length m of the opening 301 to one half of the length n of the protective member 30, thus to improve conductivity between the two.

In the present embodiment, the manufacturing method of the display panel further includes a step of cleaning exposed parts of the at least one metal pad 20 after patterning the protective member 30, so as to remove organic compounds adhered to the exposed surface of the at least one metal pad 20.

Figure 3D:
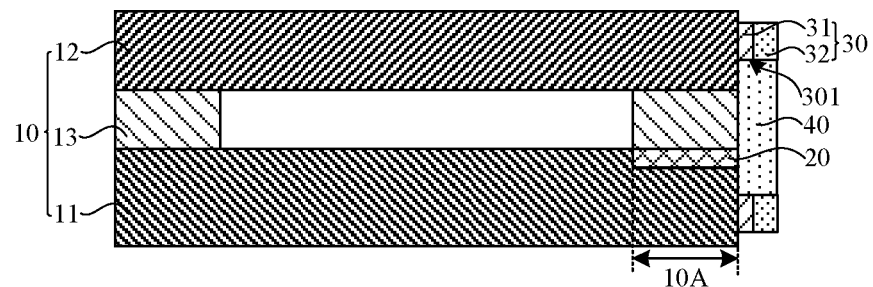
Figure 4D:
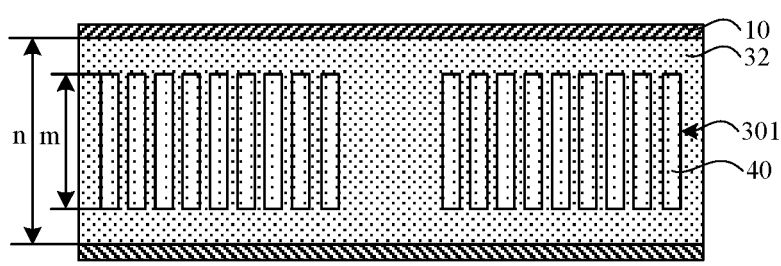

204: forming the conductive layer 40 on the exposed surface of the at least one metal pad 20, as shown in FIG. 3D and FIG. 4D.

Specifically, firstly, filling a conductive material in the opening 301. Secondly, curing the conductive material to form the conductive layer 40. Wherein a thickness of the conductive layer 40 is less than or equal to a depth of the opening 301, that is, the thickness of the conductive layer 40 is less than or equal to a thickness of the protective member 30. In the present embodiment, the conductive layer 40 is completely filled in the opening 301, and the thickness of the conductive layer 40 is equal to the thickness of the protective member 30.

In the present embodiment, the conductive material can be a silver paste. Since a segment difference exists between the exposed at least one metal pad 20, the frame glue 13, the part of the array substrate 11, and the part of the color film substrate 12, and the patterned protective member 30, the silver paste can be printed to an area where the segment difference is located through a printing process, so that the silver paste can be completely filled into the opening 301.

Compared with traditional steel screen printing processes and pad printing processes, the present embodiment does not need to develop new printing fixtures, which can save process manufacturing equipment and reduce process cost. In addition, since a pattern of the conductive layer 40 is same as a pattern of the opening 301, the present embodiment can control a film thickness and accuracy of the conductive layer 40 by forming the pattern of the conductive layer 40 in advance.

Figure 3E:
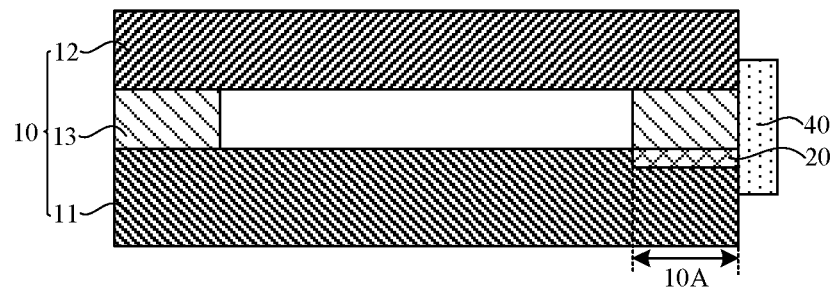
Figure 4E:
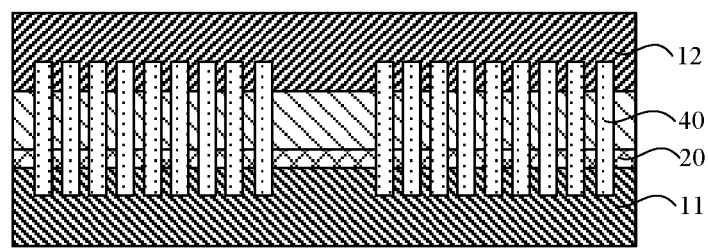
Figure 5:
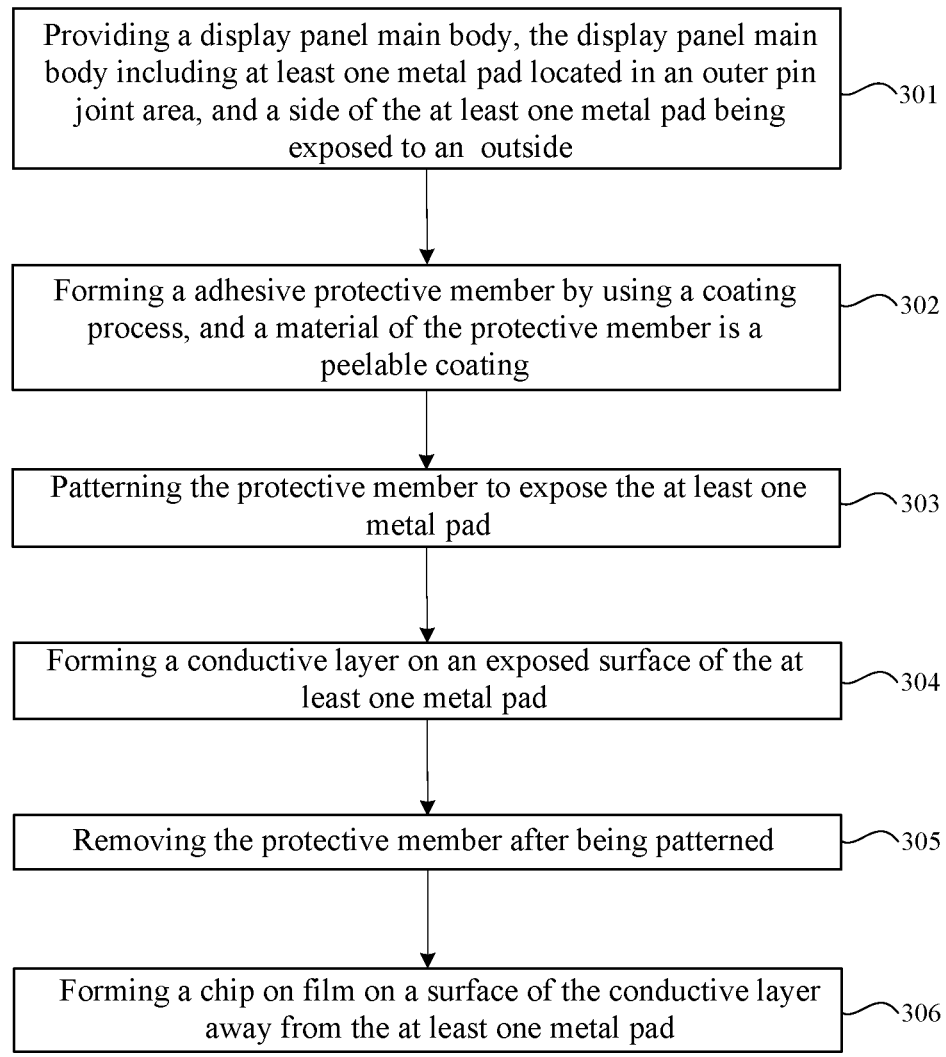
FIG. 5 is a schematic flow diagram of a manufacturing method of a display panel provided in a second embodiment of the present application.

205: removing the protective member 30 after being patterned, as shown in FIG. 3E and FIG. 4E.

Specifically, the patterned protective film 32 and the adhesive layer 31 are removed together to prevent the protective member 30 from affecting a connection between the conductive layer 40 and the chip on film 50.

Figure 3F:
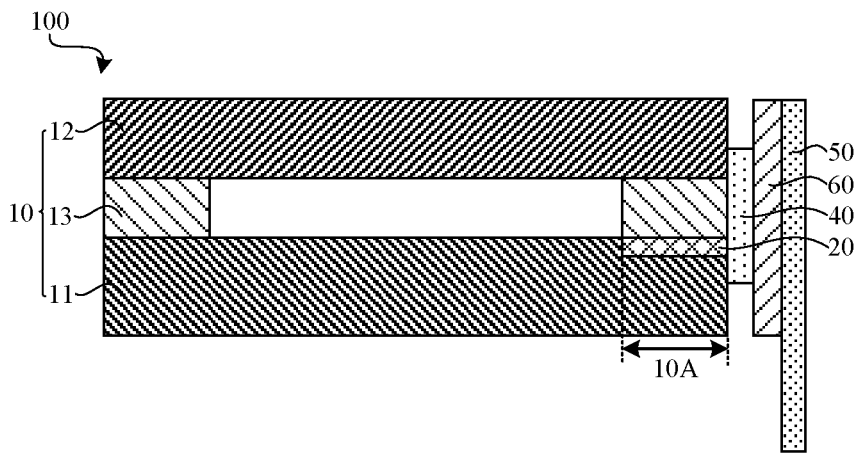

206: forming the chip on film 50 on a surface of the conductive layer 40 away from the at least one metal pad 20, as shown in FIG. 3F.

Firstly, forming an anisotropic conductive adhesive layer 60 on a side of the conductive layer 40 away from the at least one metal pad 20, then attaching and bonding the chip on film 50 to a surface of the anisotropic conductive adhesive layer 60. The bonding connection between the chip on film 50 and the at least one metal pad 20 can be achieved through the anisotropic conductive adhesive layer 60.

To sum up, in the manufacturing method of the display panel 100 provided in the first embodiment of the present application, the at least one metal pad 20 is protected by bonding the protective film 32 on the side of the display panel main body 10 after the side grinding process, so as to solve a problem that the at least one metal pad 20 is easily corroded in a state of exposing for a long time, thereby improving conductivity between the at least one metal pad 20 and the conductive layer 40, and improving the manufacturing yield of the side bonding products.

Figure 6A:
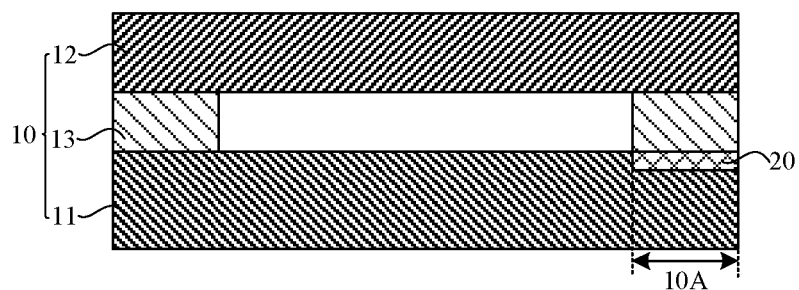
FIG. 6A to FIG. 6F are cross-sectional schematic structural diagrams obtained in sequence in each step of the manufacturing method of the display panel shown in FIG. 5.
Figure 7A:
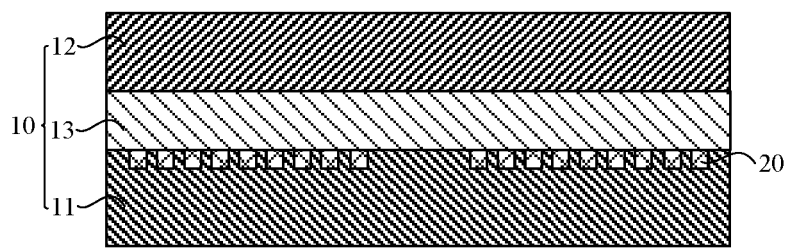
FIG. 7A to FIG. 7E are lateral schematic structural diagrams corresponding to FIG. 6A to FIG. 6E, respectively.

Referring to FIG. 5, FIG. 6A to FIG. 6F, and FIG. 7A to FIG. 7E, a manufacturing method of a display panel 100 provided in a second embodiment of the present application includes following steps:

301: providing a display panel main body 10, the display panel main body 10 including at least one metal pad 20 located in an outer pin joint area 10A, and a side of the at least one metal pad 20 being exposed to an outside, as shown in FIG. 6A and FIG. 7A.

Specifically, the display panel main body 10 includes an array substrate 11 and a color film substrate 12 disposed opposite to each other, and a frame glue 13 disposed between the array substrate 11 and the color film substrate 12. The frame glue 13 is located between the at least one metal pad 20 and the color film substrate 12. Wherein the side of the at least one metal pad 20 can be exposed by using a side grinding process.

In the present embodiment, the at least one metal pad 20 is a copper pad.

It should be noted that the display panel main body 10 in the present application further includes a liquid crystal layer (not shown in the drawings) disposed between the array substrate 11 and the color film substrate 12, the related technologies are the prior art and will not be repeated here.

Figure 6B:
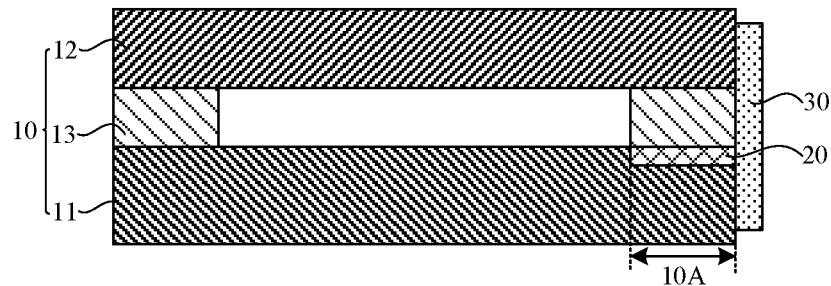
Figure 7B:
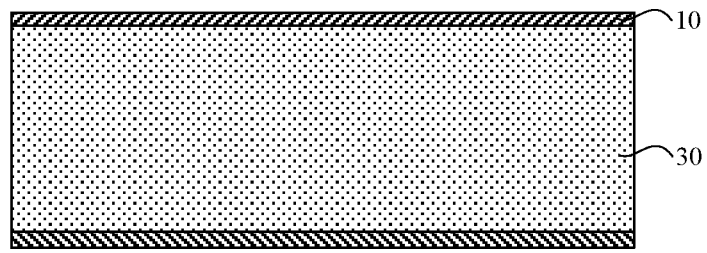

302: forming an adhesive protective member 30 by using a coating process, and a material of the protective member 30 is a peelable coating, as shown in FIG. 6B and FIG. 7B.

Wherein the forming of the protective member 30 can protect the at least one metal pad 20 from intrusion of external water and oxygen, so as to avoid corrosion of the at least one metal pad 20. In addition, since the protective member 30 has adhesion property, a stable connection between the protective member 30 and the display panel main body 10 can be ensured.

In the process route of the existing display panel, since the metal pads are exposed after the side grinding process, a corrosion problem of the metal pads easily occurs after being placed for a long time, and the exposed surfaces of the metal pads are not covered with the conductive film until the conductive material is printed, therefore, the interval between the side grinding process and the printing process of the conductive material needs to be strictly controlled in the existing process route. However, in the present embodiment, since the side of the at least one metal pad 20 is covered with the protective member 30 after the side grinding process, the at least one metal pad 20 is under protection of the protective member 30, it is not necessary to control the interval between the side grinding process and the printing process of the conductive material, so that a storage time of the display panel main body 10 can be prolonged, and requirements for storage conditions of the display panel main body 10 can be reduced.

In the present embodiment, the protective member 30 also covers the frame glue 13, a part of the array substrate 11, and a part of the color film substrate 12. It should be noted that the protective member 30 can further cover an entire side of the array substrate 11 and an entire side of the color film substrate 12, and the present application does not specifically limit a coverage area of the protective member 30.

Further, the protective member 30 is a protective coating layer, and a peelable material can be applied to the exposed surface of the at least one metal pad 20 through the coating process. Specifically, the peelable coating includes one or more of an acrylic resin, a polyurethane, and an epoxy resin. Wherein the protective coating layer can be formed by a spraying process, a spin coating process, or a scraping process.

Figure 6C:
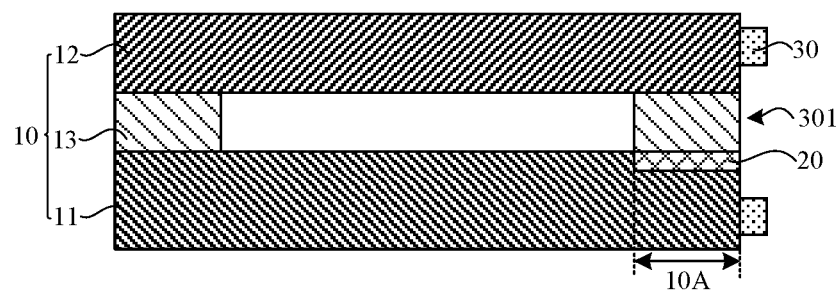
Figure 7C:
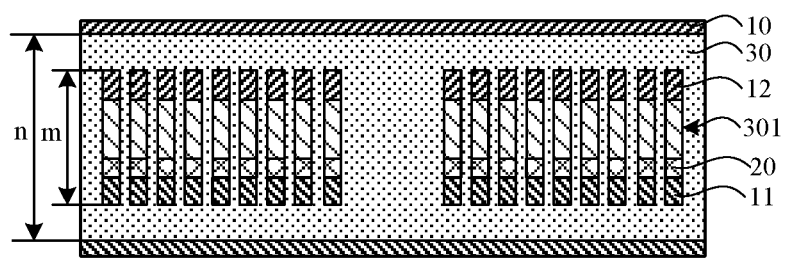

303: patterning the protective member 30 to expose the at least one metal pad 20, as shown in FIG. 6C and FIG. 7C.

Specifically, patterning the protective member 30 by using the laser cutting process to form an opening 301 exposing the at least one metal pad 20 on the protective member 30. In the present embodiment, the frame glue 13, the part of the array substrate 11, and the part of the color film substrate 12 are also exposed from the opening 301 apart from the at least one metal pad 20.

Further, an opening area of the opening 301 is greater than or equal to an area of the exposed surface of the at least one metal pad 20. In the present embodiment, in a direction parallel to the plane the array substrate 11 is located, an opening width of the opening 301 is equal to a width of the at least one metal pad 20; and in a direction from the array substrate 11 to the color film substrate 12, an opening length m of the opening 301 is greater than a length of the at least one metal pad 20. Wherein in the direction from the array substrate 11 to the color film substrate 12, the opening length m of the opening 301 ranges from one quarter to one half of a length n of the protective member 30. In some specific embodiments, the opening length m of the opening 301 is one quarter, one third, or one half of the length n of the protective member 30.

In the present embodiment, the opening length m of the opening 301 is one half of the length n of the protective member 30. When the opening width of the opening 301 is equal to the width of the at least one metal pad 20, since the opening length m of the opening 301 is equal to a length of the conductive layer 40 formed in the subsequent step, the present embodiment can improve a contact area between the at least one metal pad 20 and the conductive layer 40 by setting the opening length m of the opening 301 to one half of the length n of the protective member 30, thus to improve conductivity between the two.

In the present embodiment, the manufacturing method of the display panel further includes the step of cleaning the exposed parts of the at least one metal pad 20 after patterning the protective member 30, so as to remove organic compounds adhered to the exposed surface of the at least one metal pad 20.

Figure 6D:
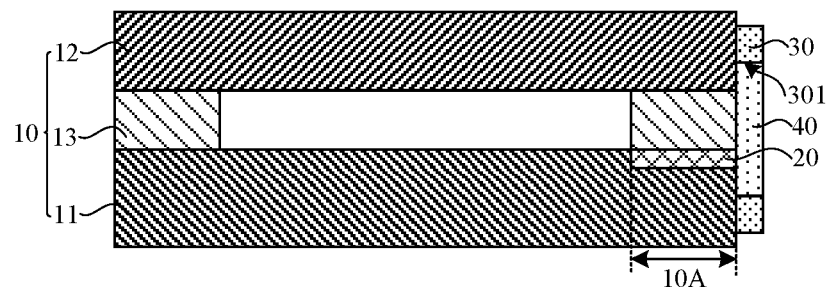
Figure 7D:
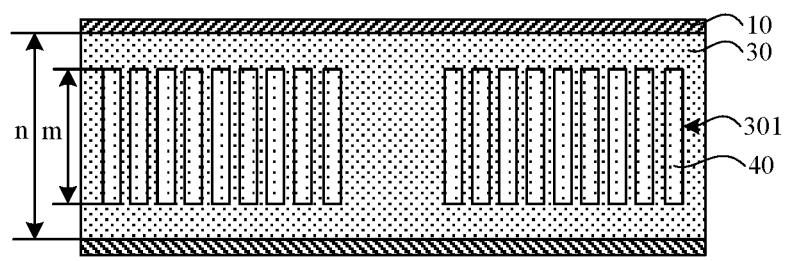

304: forming the conductive layer 40 on the exposed surface of the at least one metal pad 20, as shown in FIG. 6D and FIG. 7D.

Specifically, firstly, filling a conductive material in the opening 301. Secondly, curing the conductive material to form the conductive layer 40. Wherein a thickness of the conductive layer 40 is less than or equal to a depth of the opening 301, that is, the thickness of the conductive layer 40 is less than or equal to a thickness of the protective member 30. In the present embodiment, the conductive layer 40 is completely filled in the opening 301, and the thickness of the conductive layer 40 is equal to the thickness of the protective member 30.

In the present embodiment, the conductive material can be the silver paste. Since a segment difference exists between the exposed at least one metal pad 20, the frame glue 13, the part of the array substrate 11, and the part of the color film substrate 12, and the patterned protective member 30, the silver paste can be printed to an area where the segment difference is located through the printing process, so that the silver paste can be completely filled into the opening 301.

Compared with the traditional steel screen printing processes and the pad printing processes, the present embodiment does not need to develop the new printing fixtures, which can save process manufacturing equipment and reduce process cost. In addition, since the pattern of the conductive layer 40 is same as the pattern of the opening 301, the present embodiment can control the film thickness and accuracy of the conductive layer 40 by forming the pattern of the conductive layer 40 in advance.

Figure 6E:
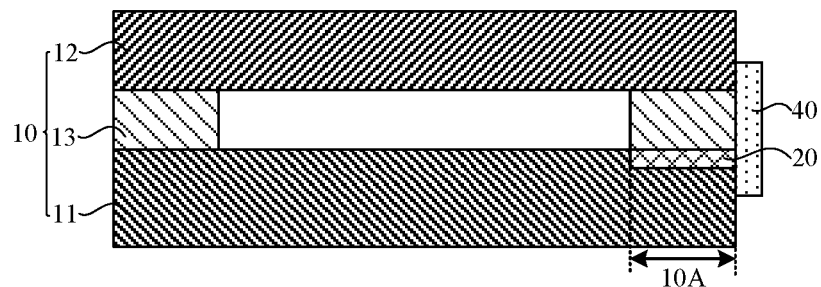
Figure 7E:
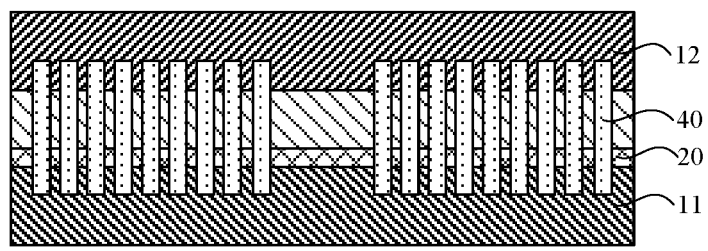

305: removing the protective member 30 after being patterned, as shown in FIG. 6E and FIG. 7E.

Since the material of the protective member 30 is the peelable coating, the protective member 30 is easily separated from the display panel main body 10. Therefore, the patterned protective member 30 can be removed by tearing, so as to prevent the protective member 30 from affecting the connection between the conductive layer 40 and the chip on film 50.

Figure 6F:
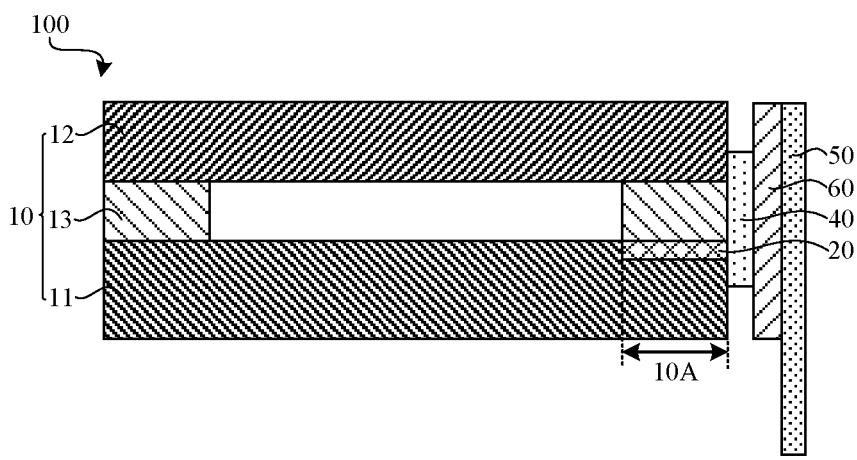

306: forming the chip on film 50 on the surface of the conductive layer 40 away from the at least one metal pad 20, as shown in FIG. 6F.

Firstly, forming an anisotropic conductive adhesive layer 60 on the side of the conductive layer 40 away from the at least one metal pad 20, then attaching and bonding the chip on film 50 to the surface of the anisotropic conductive adhesive layer 60. The bonding connection between the chip on film 50 and the at least one metal pad 20 can be achieved through the anisotropic conductive adhesive layer 60.

To sum up, in the manufacturing method of the display panel 100 provided in the second embodiment of the present application, the at least one metal pad 20 is protected by coating the protective member 30 on the side of the display panel main body 10 after the side grinding process, so as to solve the problem that the at least one metal pad 20 is easily to corroded in the state of exposing for a long time, thereby improving conductivity between the at least one metal pad 20 and the conductive layer 40, and improving the manufacturing yield of the side bonding products.

Figure 8:
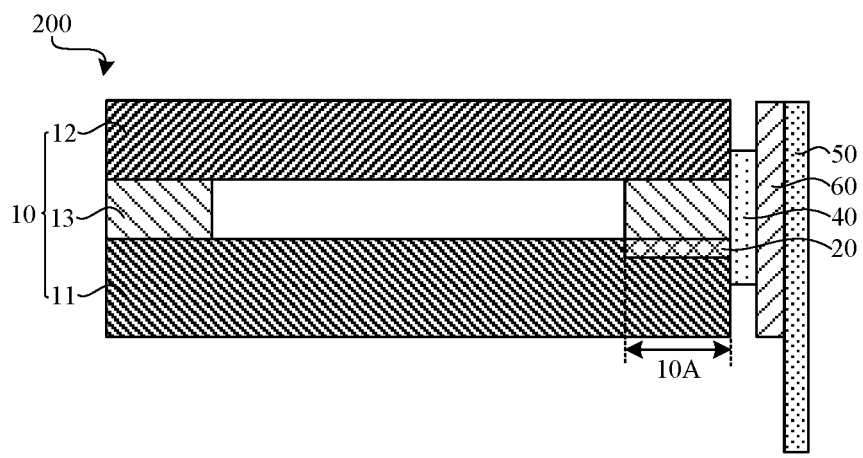
FIG. 8 is a cross-sectional schematic structural diagram of the display panel provided by the present application.

Referring to FIG. 8, the present application provides the display panel 200. The display panel 200 includes the display panel main body 10, the conductive layer 40, the chip on film 50, and the anisotropic conductive adhesive layer 60. Wherein the display panel main body 10 includes the at least one metal pad 20 located in the outer pin joint area 10A. The conductive layer 40 is disposed on the side of the display panel main body 10 and connected with the at least one metal pad 20. The anisotropic conductive adhesive layer 60 is disposed on a side of the chip on film 50 close to the conductive layer 40, and the chip on film 50 is connected with the conductive layer 40 through the anisotropic conductive adhesive layer 60 to achieve the electrical connection with the at least one metal pad 20.

Wherein the display panel main body 10 further includes the array substrate 11 and the color film substrate 12 disposed opposite to each other, and the frame glue 13 disposed between the array substrate 11 and the color film substrate 12. The frame glue 13 is located between the at least one metal pad 20 and the color film substrate 12.

It should be noted that the display panel 200 can be prepared by the manufacturing method of the display panel 100 provided by the first embodiment or the second embodiment, and a specific manufacturing method can be referred to the description of the above embodiment and will not be repeated here.

The present application also provides a display device. Wherein the display device can be any product or component with display functions, such as an electronic paper, a mobile phone, a tablet computer, a TV, a display, a notebook computer, a digital photo frame, or a navigator, etc.

Specifically, the display device includes the display panel, the display panel can be the display panel 200 described in the above embodiment. Specific structures of the display panel 200 can be referred to the description of the above embodiment and will not be repeated here.

The above describes the manufacturing method of the display panel and the display panel provided in the embodiments of the present application in detail. In this paper, specific examples are applied to explain a principle and implementation modes of the present application. The descriptions of the above embodiments are only used to help understand a method and a core idea of the present application; meanwhile, for those skilled in the art, there will be changes in the specific implementation modes and an application scope according to the idea of the present application. In conclusion, contents of the specification should not be understood as restrictions on the present application.

What is claimed is:

1. A manufacturing method of a display panel, comprising following steps:

providing a display panel main body, the display panel main body comprising at least one metal pad located in an outer pin joint area, and a side surface of the at least one metal pad being exposed to an outside;

forming a protective member covering the side surface of the at least one metal pad on a side surface of the display panel main body;

patterning the protective member to expose the side surface of the at least one metal pad;

forming a conductive layer on an exposed surface of the at least one metal pad; and forming a chip on film on a surface of the conductive layer away from the at least one metal pad, wherein the protective member comprises an adhesive layer and a protective film, the adhesive layer is attached between the side surface of the display panel main body and the protective film, and the adhesive layer covers the side surface of the at least one metal pad, and wherein a release film is attached to a side of the adhesive layer away from the protective film before forming the protective member, wherein forming the protective member covering the side surface of the at least one metal pad on the side surface of the display panel main body comprising: tearing off the release film and attaching the protective member to the side surface of the display panel main body.

2. The manufacturing method of the display panel according to claim 1, wherein a material of the protective film comprises one or more of a polyethylene terephthalate, a polystyrene, a polycarbonate, a polyvinyl chloride, and a phthalaldehyde.

3. The manufacturing method of the display panel according to claim 1, wherein the step of forming the protective member covering the side surface of the at least one metal pad on the side surface of the display panel main body comprises forming an adhesive protective member by using a coating process, and a material of the protective member is a peelable coating.

4. The manufacturing method of the display panel according to claim 3, wherein the peelable coating comprises one or more of an acrylic resin, a polyurethane, and an epoxy resin.

5. The manufacturing method of the display panel according to claim 1, wherein after the step of patterning the protective member, an opening exposing the side surface of the at least one metal pad is formed on the protective member; and the step of forming the conductive layer on the exposed surface of the at least one metal pad comprises:

filling the opening with a conductive material; and
curing the conductive material to form the conductive layer, and a thickness of the conductive layer being less than or equal to a thickness of the protective member.

6. The manufacturing method of the display panel according to claim 5, wherein the display panel main body comprises an array substrate and a color film substrate disposed opposite to each other, and a frame glue disposed between the array substrate and the color film substrate; the frame glue is located between the at least one metal pad and the color film substrate, and the frame glue, a part of the array substrate, and a part of the color film substrate are exposed from the opening.

7. The manufacturing method of the display panel according to claim 6, wherein in a direction from the array substrate to the color film substrate, an opening length of the opening ranges from one quarter to one half of a length of the protective member.

8. The manufacturing method of the display panel according to claim 5, wherein the conductive material is a silver paste.

9. The manufacturing method of the display panel according to claim 8, wherein the at least one metal pad is a copper pad.

10. The manufacturing method of the display panel according to claim 1, wherein after the step of patterning the protective member and before the step of forming the conductive layer on the exposed surface of the at least one metal pad, the manufacturing method further comprises cleaning an exposed part of the at least one metal pad.

11. The manufacturing method of the display panel according to claim 1, wherein after the step of forming the conductive layer on the exposed surface of the at least one metal pad and before the step of forming the chip on film on the surface of the conductive layer away from the at least one metal pad, the manufacturing method further comprises removing the protective member after being patterned.

12. The manufacturing method of the display panel according to claim 1, wherein the step of patterning the protective member comprises patterning the protective member by using a laser cutting process to form an opening exposing the side surface of the at least one metal pad on the protective member.

13. The manufacturing method of the display panel according to claim 12, wherein an opening area of the opening is greater than an area of the exposed surface of the at least one metal pad.

14. The manufacturing method of the display panel according to claim 13, wherein the display panel main body comprises an array substrate and a color film substrate disposed opposite to each other, and a frame glue disposed between the array substrate and the color film substrate, and the frame glue is located between the at least one metal pad and the color film substrate; and in a direction parallel to a plane the array substrate is located, an opening width of the opening is equal to a width of the at least one metal pad; and in a direction from the array substrate to the color film substrate, an opening length of the opening is greater than a length of the at least one metal pad.

15. The manufacturing method of the display panel according to claim 1, wherein the step of forming the chip on film on the surface of the conductive layer away from the at least one metal pad comprises:

forming an anisotropic conductive adhesive layer on a side of the conductive layer away from the at least one metal pad; and attaching and bonding the chip on film to a surface of the anisotropic conductive adhesive layer.

16. A display panel, wherein the display panel is prepared by the manufacturing method of the display panel according to claim 1.

* * * * *